United States Patent
Tsurukame et al.

(10) Patent No.: US 12,292,319 B2
(45) Date of Patent: May 6, 2025

(54) PROPAGATION TIME MEASUREMENT DEVICE

(71) Applicant: OMRON Corporation, Kyoto (JP)

(72) Inventors: Yoshitaka Tsurukame, Kyoto (JP); Yui Ishida, Kyoto (JP); Masaki Yawata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 349 days.

(21) Appl. No.: 18/006,397

(22) PCT Filed: Jul. 20, 2021

(86) PCT No.: PCT/JP2021/027198
§ 371 (c)(1),
(2) Date: Jan. 23, 2023

(87) PCT Pub. No.: WO2022/030251
PCT Pub. Date: Feb. 10, 2022

(65) Prior Publication Data
US 2023/0324208 A1 Oct. 12, 2023

(30) Foreign Application Priority Data
Aug. 7, 2020 (JP) .................. 2020-135276

(51) Int. Cl.
*G01F 1/667* (2022.01)
*G01F 1/66* (2022.01)
*G01F 25/10* (2022.01)

(52) U.S. Cl.
CPC .............. *G01F 1/667* (2013.01); *G01F 1/662* (2013.01); *G01F 25/10* (2022.01)

(58) Field of Classification Search
CPC .......... G01F 1/667; G01F 1/662; G01F 1/668; G01F 25/10; G01M 9/065;
(Continued)

(56) References Cited

U.S. PATENT DOCUMENTS 4,493,217 A * 1/1985 Engler .................... G01P 5/001
73/601
6,745,632 B1 * 6/2004 Dryer .................... G01N 29/46
73/861.27
(Continued)

FOREIGN PATENT DOCUMENTS

JP    2003279396 A    10/2003
JP    2008249400 A    10/2008
(Continued)

OTHER PUBLICATIONS

International Search Report issued in Intl. Appln. No. PCT/JP2021/027198 mailed Sep. 7, 2021. English translation provided.
(Continued)

*Primary Examiner* — Kristina M Deherrera
*Assistant Examiner* — Gedeon M Kidanu
(74) *Attorney, Agent, or Firm* — ROSSI, KIMMS & McDOWELL LLP

(57) ABSTRACT

A device determines the propagation time of an acoustic signal by cross-correlation analysis between a transmission signal and a reception signal. The device determines the propagation time by cross-correlation analysis between the transmission signal and the reception signal from which reverberation has yet to be removed, removes, from the reception signal, as the reverberation, a signal component at and after a time point based on the determined propagation time, and redetermines a propagation time by cross-correlation analysis between the transmission signal and the reception signal from which the reverberation has been removed.

12 Claims, 11 Drawing Sheets

(58) Field of Classification Search
CPC ....... G01N 2291/02836; G01N 29/024; G01N 29/348; G01N 29/4436; G01N 29/4472; G01N 29/46; G01N 29/50; G01P 5/001; G01P 5/244; G01P 5/245; G01S 15/58; F24F 11/30; F24F 11/52; F24F 11/72; F24F 2110/50; F24F 2110/64; F24F 2110/65; F24F 2110/66; F24F 2110/70
See application file for complete search history.

(56) References Cited

U.S. PATENT DOCUMENTS

| | | | |
|---|---|---|---|
| 6,796,189 | B1 | 9/2004 | Umekage et al. |
| 7,634,366 | B2 * | 12/2009 | Takemura ............... G01F 1/667 702/45 |
| 9,689,726 | B2 | 6/2017 | Ramamurthy et al. |
| 2010/0154562 | A1 | 6/2010 | Fukuhara et al. |

FOREIGN PATENT DOCUMENTS

| | | |
|---|---|---|
| JP | 4983787 B2 | 7/2012 |
| JP | 2013185891 A | 9/2013 |
| JP | 2017187310 A | 10/2017 |
| JP | 2018128264 A | 8/2018 |

OTHER PUBLICATIONS

Written Opinion issued in Intl. Appln. No. PCT/JP2021/027198 mailed Sep. 7, 2021. English translation provided.

Extended European search report issued in European Appln. No. 21853437.8, mailed Jun. 25, 2024.

Hein "Triple-Beam Lens Transducers for Three-Dimensional Ultrasonic Fluid Flow Estimation". IEEE Transactions on Ultrasonics, Ferroelectrics, and Frequency Control, IEEE. Sep. 1995: pp. 854-869. vol. 42, No. 5. Cited in NPL 1.

* cited by examiner

PROPAGATION TIME MEASUREMENT DEVICE

TECHNICAL FIELD

The present invention relates to a technique for measuring the propagation time of an acoustic signal.

BACKGROUND ART

Known devices in practical use measure the propagation time of an acoustic signal propagating inside a pipe with a sensor externally mounted on the pipe. The devices nondestructively measure the flow velocity and the flow rate of a fluid flowing in the pipe based on the propagation time. Such a device typically uses ultrasound as an acoustic signal, and is referred to as, for example, an ultrasonic flowmeter.

For example, Patent Literature 1 describes a device that uses a pair of upstream and downstream ultrasonic transducers on a pipe to determine the flow rate of a fluid based on the difference in a propagation time between ultrasound propagating in the flow direction of the fluid and ultrasound propagating in the direction opposite to the flow direction. The device in Patent Literature 1 calculates, as the propagation time difference, the cross-correlation between the signal received by the upstream ultrasonic transducer and the signal received by the downstream ultrasonic transducer.

CITATION LIST

Patent Literature

Patent Literature 1: Japanese Unexamined Patent Application Publication No. 2017-187310

SUMMARY OF INVENTION

Technical Problem

However, transducers that receive acoustic signals such as ultrasound cannot stop immediately after they stop receiving acoustic signals, and output electric signals (reception signals) containing reverberation. Any reverberation contained in a reception signal can be noise that affects accurate determination of the propagation time and undermine accurate determination of the flow velocity and the flow rate of the fluid flowing through the pipe.

In response to the above issue, one or more aspects of the present invention are directed to a technique for determining a propagation time accurately.

Solution to Problem

The technique according to one or more aspects of the present invention has the structure below.

A propagation time measurement device according to a first aspect of the present invention includes a plurality of transducers and a signal processor. The plurality of transducers are at different positions with respect to a pipe through which a fluid flows. The plurality of transducers include a first transducer that converts a transmission signal as an electrical signal to an acoustic signal and a second transducer that receives the acoustic signal transmitted from the first transducer through the fluid in the pipe and converts the received acoustic signal to a reception signal as an electrical signal. The signal processor removes reverberation from the reception signal and determines a propagation time of the acoustic signal from the first transducer to the second transducer by cross-correlation analysis between the transmission signal and the reception signal from which the reverberation has been removed. The signal processor determines a propagation time of the acoustic signal from the first transducer to the second transducer by cross-correlation analysis between the transmission signal and the reception signal from which the reverberation has yet to be removed, removes, as the reverberation, a signal component at and after a time point based on the determined propagation time, and redetermines the propagation time of the acoustic signal from the first transducer to the second transducer by cross-correlation analysis between the transmission signal and the reception signal from which the reverberation has been removed.

The reverberation contained in the reception signal affects determination of the propagation time. The time point at which the reverberation occurs can thus be determined accurately based on the propagation time determined using the reception signal from which the reverberation has yet to be removed. The above structure removes, as reverberation, any signal component at and after the time point determined as above from the reception signal and uses the reception signal from which the reverberation has been removed to redetermine the propagation time. The reverberation can thus be removed accurately, and the propagation time can be determined accurately. Additionally, calculating the propagation time can avoid use of unintended signal values (signal values representing the reverberation). This reduces the processing time for calculating the propagation time and the power consumption used to calculate the propagation time.

The receiving transducer is expected to receive an acoustic signal with the same duration as the transmission signal after the propagation time elapses. In the reception signal, any signal component after the acoustic signal is received serves as reverberation. In the first aspect, the time point may be a time point at which a total time of the propagation time determined by the cross-correlation analysis between the transmission signal and the reception signal from which the reverberation has yet to be removed and a duration of the transmission signal elapses from when the transmission signal is input into the first transducer. The reverberation can be removed more accurately to allow the propagation time to be determined more accurately.

A propagation time measurement device according to a second aspect of the present invention includes a plurality of transducers and a signal processor. The plurality of transducers are at different positions with respect to a pipe through which a fluid flows. The plurality of transducers include a first transducer that converts a transmission signal as an electrical signal to an acoustic signal and a second transducer that receives the acoustic signal transmitted from the first transducer through the fluid in the pipe and converts the received acoustic signal to a reception signal as an electrical signal. The signal processor removes reverberation from the reception signal and determines a propagation time of the acoustic signal from the first transducer to the second transducer by cross-correlation analysis between the transmission signal and the reception signal from which the reverberation has been removed. The signal processor approximates an envelope of a waveform of the reception signal from which the reverberation has yet to be removed, determines a threshold based on the envelope, and removes, as the reverberation, a signal component at and after a time point at which a signal value of the reception signal converges to or below the determined threshold.

The waveform of the reception signal defines an envelope with a relatively high value, whereas the reverberation has a relatively low signal value. The time point at which the reverberation occurs can thus be determined accurately based on the envelope. The above structure approximates the envelope from the reception signal and removes, from the reception signal, as reverberation, any signal component at and after the time point at which the signal value converges to or below a threshold based on the envelope. The reception signal from which the reverberation has been removed is then used to determine the propagation time. The reverberation can thus be removed accurately, and the propagation time can be determined accurately. Additionally, calculating the propagation time can avoid use of unintended signal values (signal values representing the reverberation). This reduces the processing time for calculating the propagation time and the power consumption used to calculate the propagation time.

In the second aspect, the signal processor may determine a value obtained by reducing a peak of the envelope by a predetermined factor as the threshold. In the second aspect, the signal processor may determine, as the threshold, one of a plurality of discrete values at a predetermined ordinal position from a greatest discrete value included in the envelope.

A propagation time measurement device according to a third aspect of the present invention includes a plurality of transducers and a signal processor. The plurality of transducers are at different positions with respect to a pipe through which a fluid flows. The plurality of transducers include a first transducer that converts a transmission signal as an electrical signal to an acoustic signal and a second transducer that receives the acoustic signal transmitted from the first transducer through the fluid in the pipe and converts the received acoustic signal to a reception signal as an electrical signal. The signal processor removes reverberation from the reception signal and determines a propagation time of the acoustic signal from the first transducer to the second transducer by cross-correlation analysis between the transmission signal and the reception signal from which the reverberation has been removed. The signal processor removes, as the reverberation, a signal component at and after a time point at which a signal value of the reception signal converges to or below a peak at a predetermined ordinal position from a highest peak of a plurality of peaks shown by the reception signal from which the reverberation has yet to be removed.

The reception signal shows multiple peaks that gradually increase and then gradually decrease. The reverberation has a relatively low signal value. The time point at which the reverberation occurs can thus be determined accurately based on the multiple peaks. The above structure uses one of the multiple peaks at the predetermined ordinal position from the highest peak to remove, from the reception signal, as reverberation, any signal component at and after the time point at which the signal value converges to or below the threshold, and determines the propagation time using the reception signal from which the reverberation has been removed. The reverberation can thus be removed accurately, and the propagation time can be determined accurately. Additionally, calculating the propagation time can avoid use of unintended signal values (signal values representing the reverberation). This reduces the processing time for calculating the propagation time and the power consumption used to calculate the propagation time.

The structure in each of the first, second, and third aspects may further include a storage that prestores information about the time point. The signal processor may remove the reverberation based on the information prestored in the storage. The information about the time point may or may not simply indicate the time point. For example, the information about the time point may indicate the propagation time determined using the reception signal from which the reverberation has yet to be removed or indicate the threshold based on the envelope or the multiple peaks.

In each of the first, second, and third aspects, the signal processor may obtain information about the time point using a plurality of reception signals resulting from a plurality of transmission operations from the first transducer and resulting from a plurality of reception operations at the second transducer. This allows the time point at which the reverberation occurs to be determined more accurately. This thus allows the reverberation to be removed more accurately and the propagation time to be determined more accurately.

In each of the first, second, and third aspects, the first transducer and the second transducer may be opposite to each other across the pipe. In each of the first, second, and third aspects, the first transducer and the second transducer may be at different positions in a longitudinal direction of the pipe.

The structure in each of the first, second, and third aspects may further include a switch that performs switching to cause the second transducer to receive an input of the transmission signal and transmit an acoustic signal and to cause the first transducer to receive the acoustic signal transmitted from the second transducer and output the reception signal. The signal processor may further remove reverberation from the reception signal output from the first transducer, and determine a propagation time of the acoustic signal from the second transducer to the first transducer by cross-correlation analysis between the transmission signal input into the second transducer and the reception signal output from the first transducer and from which the reverberation has been removed. This allows accurate determination of the propagation time of the acoustic signal propagating downstream and the propagation time of the acoustic signal propagating upstream for the same propagation path.

The signal processor may determine at least one of a flow velocity or a flow rate of the fluid in the pipe based on a difference between the propagation time of the acoustic signal from the first transducer to the second transducer and the propagation time of the acoustic signal from the second transducer to the first transducer. This allows information about the fluid in the pipe to be determined highly accurately.

One or more aspects of the present invention may be directed to a propagation time measurement device including at least one of the above components or to, for example, a flow velocity measurement device, a flow rate measurement device, a flowmeter, or a flow sensor. One or more aspects of the present invention may be directed to a propagation time measurement method, a flow velocity measurement method, or a flow rate measurement method including at least one of the above processes. One or more aspects of the present invention may be directed to a program for implementing any of these methods or to a non-transitory storage medium storing the program. The present invention may be implemented by combining the above components and processes in any possible manner.

Advantageous Effects of Invention

The technique according to the above aspects of the present invention allows a propagation time to be determined accurately.

DESCRIPTION OF EMBODIMENTS

<Example Use>

Figure 1:
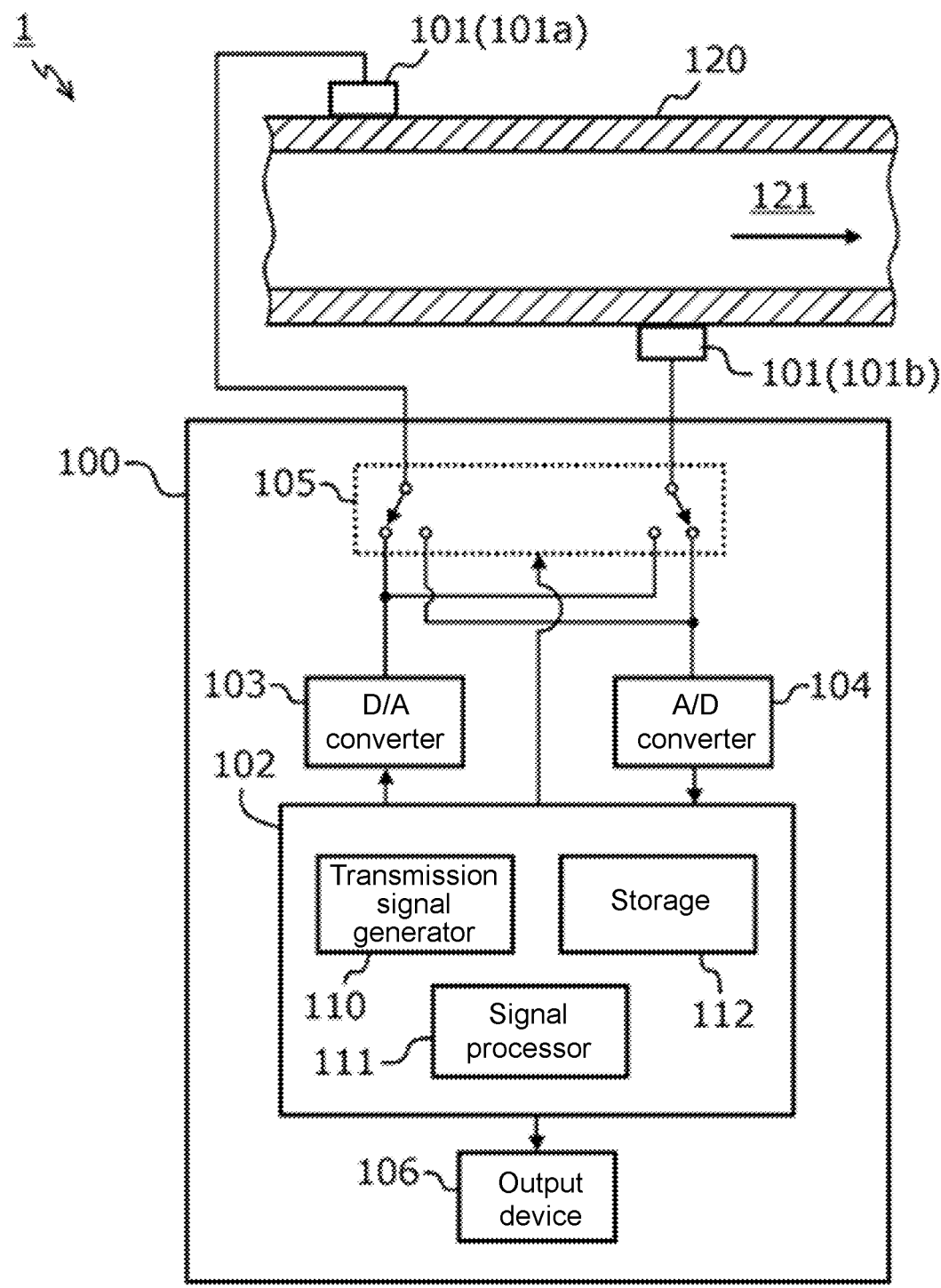
FIG. 1 is a schematic diagram of a propagation time measurement device.

An example use of a propagation time measurement device will be described with reference to FIG. 1.

A propagation time measurement device 1 includes two or more transducers 101 to receive an acoustic signal transmitted from one transducer (e.g., a transducer 101a) with another transducer (e.g., a transducer 101b) and determine the time (propagation time) taken for the acoustic signal to propagate on a path between the two transducers. The transducers 101 are at different positions with respect to a pipe 120. The acoustic signal propagating between the two transducers 101 thus travels through (crosses) the pipe 120. The propagation time of the acoustic signal is not constant but varies in accordance with the state (e.g., flow velocity, flow rate, or any bubbles or foreign matter) of a fluid 121 flowing in the pipe 120. Thus, the propagation time measured by the propagation time measurement device 1 can be used to measure the state of the fluid 121 in the pipe 120 nondestructively.

The fluid 121 can be any substance that can transmit acoustic signals, including a liquid or a gas. Acoustic signals are typically ultrasonic but may include audible sound waves.

The propagation time measurement device 1 uses cross-correlation analysis to calculate the propagation time. For example, a transmission signal is an electric signal for driving a transmitting transducer 101, and a reception signal is an electric signal output from a receiving transducer 101. The propagation time measurement device 1 calculates the cross-correlation function between the transmission signal and the reception signal. The propagation time measurement device 1 then determines the lag (time delay) of the reception signal to the transmission signal based on the position of the maximum peak in the cross-correlation function. This lag corresponds to the propagation time of the acoustic signal from the transmitting transducer 101 to the receiving transducer 101.

When the signal waveform of the transmission signal is retained sufficiently in the reception signal, a distinctive peak occurs in the cross-correlation function. Thus, the lag (or propagation time) between the two signals can be determined accurately. However, the receiving transducer 101 cannot stop immediately after stopping receiving an acoustic signal. The reception signal thus contains reverberation. Any reverberation contained in the reception signal can be noise that can cause, for example, peaks to occur at temporal positions different from the actual propagation time in the cross-correlation function and can undermine accurate determination of the propagation time. Thus, the flow velocity and the flow rate of the fluid 121 flowing in the pipe 120 cannot be determined accurately. Flowmeters that can measure low flow rates are now awaited to measure the propagation time with the accuracy of, for example, nanosecond order to picosecond order.

The propagation time measurement device 1 removes the reverberation from the reception signal and uses the resultant reception signal to determine the propagation time. More specifically, the propagation time measurement device 1 removes the reverberation with one of the first to third methods described below. Removing the reverberation is any process that excludes the signal value representing the reverberation from cross-correlation analysis (from calculation of the cross-correlation function). For example, the removal process may include setting (cutting) the signal value corresponding to the reverberation to zero or distinguishing the signal value representing the reverberation from other signal values.

(First Method)

With the first method, the propagation time measurement device 1 determines the propagation time by analyzing the cross-correlation between the transmission signal and the reception signal from which the reverberation has yet to be removed, and removes, as reverberation, any signal component at and after the time point based on the determined propagation time. The propagation time measurement device 1 then redetermines the propagation time by analyzing the cross-correlation between the transmission signal and the reception signal from which the reverberation has been removed.

The reverberation contained in the reception signal affects determination of the propagation time. The time point at which the reverberation occurs can thus be determined accurately based on the propagation time determined using the reception signal from which the reverberation has yet to be removed. The first method removes, as reverberation, any signal component at and after the time point determined as above from the reception signal and uses the reception signal from which the reverberation has been removed to redetermine the propagation time. This allows the reverberation to be removed accurately, the correct peak (peak at a position corresponding to the actual propagation time) to be detected accurately from the cross-correlation function, and the propagation time to be determined accurately.

(Second Method)

With the second method, the propagation time measurement device 1 approximates, from the reception signal from which the reverberation has yet to be removed, the envelope of the waveform of the reception signal, determines a threshold based on the approximated envelope, and removes, as reverberation, any signal component at and after the time point at which the signal value converges to or below the determined threshold.

The waveform of the reception signal defines an envelope with a relatively high value, whereas the reverberation has a relatively low signal value. The time point at which the reverberation occurs can thus be determined accurately based on the envelope. With the second method, the envelope is approximated from the reception signal, and any signal component at and after the time point at which the signal value converges to or below the threshold based on the envelope is removed from the reception signal as reverberation. The reception signal from which the reverberation has been removed is then used to determine the propagation time. This allows the reverberation to be removed accurately, the correct peak to be detected accurately from the cross-correlation function, and the propagation time to be determined accurately.

(Third Method)

With the third method, the propagation time measurement device 1 removes, as reverberation, any signal component at and after the time point at which the signal value converges to or below the peak at a predetermined ordinal position from the highest peak of the multiple peaks shown by the reception signal from which the reverberation has yet to be removed.

The reception signal shows multiple peaks that gradually increase and then gradually decrease. The reverberation has a relatively low signal value. The time point at which the reverberation occurs can thus be determined accurately based on the multiple peaks. The third method uses one of the multiple peaks at the predetermined ordinal position from the highest peak as a threshold to remove, as reverberation, any signal component at and after the time point at which the signal value converges to or below the threshold from the reception signal and determines the propagation time using the reception signal from which the reverberation has been removed. This allows the reverberation to be removed accurately, the correct peak to be detected accurately from the cross-correlation function, and the propagation time to be determined accurately.

With any of the first to third methods, calculating the propagation time (specifically, calculating the cross-correlation function) can avoid use of unintended signal values (signal values representing the reverberation). This reduces the processing time for calculating the propagation time and the power consumption used to calculate the propagation time.

First Embodiment (Apparatus Configuration)

The specific structure of the propagation time measurement device 1 will be described with reference to FIGS. 1 and 2. FIG. 1 is schematic block diagram of the propagation time measurement device 1. FIG. 2 is a cross-sectional view of example transducers mounted on a pipe. The propagation time measurement device 1 according to the present embodiment nondestructively measures the flow velocity and the flow rate of the fluid 121 flowing in the pipe 120. The device is also referred to as an ultrasonic flowmeter or an ultrasonic flow sensor.

The propagation time measurement device 1 includes a main body 100 and the multiple transducers 101. The main body 100 and each transducer 101 are connected with a cable. In the present embodiment, the structure includes two transducers 101, or more specifically, a first transducer 101a upstream in the longitudinal direction of the pipe 120 and a second transducer 101b downstream from the first transducer 101a. The two transducers are hereafter referred to as the first transducer 101a and the second transducer 101b when distinguished from each other and simply as transducers 101 or a transducer 101 when described commonly. The structure may include three or more transducers 101, rather than two transducers 101.

The transducers 101 convert an electrical signal to an acoustic signal and an acoustic signal to an electric signal. The transducers 101 may also be referred to as transducers. For example, the transducers 101 may be, for example, piezoelectric elements that use the piezoelectric effect to convert a force to a voltage and a voltage to a force. As shown in FIG. 2, each transducer 101 is buried in a resin clamp 30. With the clamp 30 holding the pipe 120, the two transducers 101a and 101b are opposite to each other across the pipe 120. The line segment connecting the two transducers 101a and 101b extends at a predetermined angle θ with the axis of the pipe 120. This clamp structure facilitates mounting of the transducers 101 onto the existing pipe 120 at appropriate positions (without any modification to the pipe 120). Any grease or gel applied between the pipe 120 and the clamp 30 can tightly connect the pipe 120 and the clamp 30 together and increase the acoustic impedance matching between them. The angle θ is the propagation angle of the acoustic signal. The propagation angle θ may be 0<θ<90 degrees, or more specifically, 20<θ<60 degrees to use transit-time described below, although the angle may be set to any angle.

The main body 100 mainly includes a control circuit 102, a digital-to-analog (D/A) converter 103, an analog-to-digital (A/D) converter 104, a switch 105, and an output device 106. The control circuit 102 controls the components of the propagation time measurement device 1 and performs, for example, signal processing and computations. The D/A converter 103 performs D/A conversion and signal amplification based on a transmission signal (digital data) input from the control circuit 102 and outputs the resulting transmission signal (analog signal) at a predetermined voltage to one of the transducers 101. The A/D converter 104 converts a reception signal (analog signal) input from another transducer 101 to digital data at predetermined sampling intervals and outputs the resulting reception signal (digital data) to the control circuit 102. The switch 105 switches the connection of the D/A converter 103 and the A/D converter 104 with the first transducer 101a and the second transducer 101b. The transducer 101 connected to the D/A converter 103 serves as a transmitter. The transducer 101 connected to the A/D converter 104 serves as a receiver. The output device 106 outputs information such as the results of signal processing and computations performed by the control circuit 102. For example, the output device 106 is a display. The main body 100 may also include an input device (e.g., buttons or a touch panel) for user operations and a communication circuit (e.g., Wi-Fi module) to transmit information to an external device (e.g., an external computer or a server).

Figure 2:
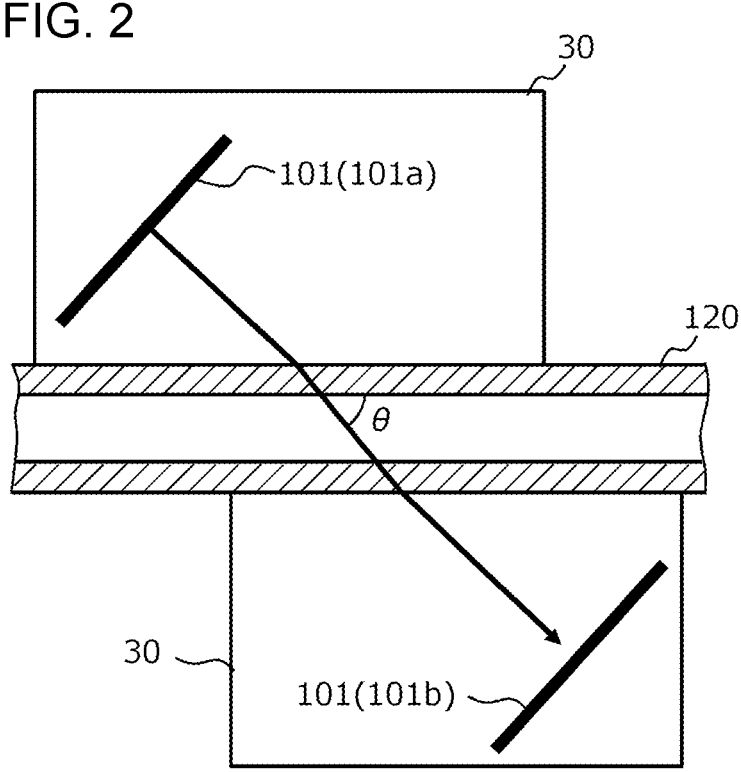
FIG. 2 is a cross-sectional view of example transducers mounted on a pipe.

As shown in FIG. 1, the control circuit 102 includes a transmission signal generator 110, a signal processor 111, and a storage 112. The transmission signal generator 110 generates transmission signal data for measurement and outputs the data to the D/A converter 103. The signal processor 111 calculates the propagation time of the acoustic signal based on the transmission signal and the reception signal and also calculates the flow velocity, the flow rate, or both of the fluid based on the propagation time. The signal processor 111 also removes reverberation from the reception signal. In the present embodiment, the signal processor 111 removes reverberation using the first method described above. The storage 112 stores waveform data that defines the waveform of the transmission signal. The transmission signal generator 110 reads the waveform data from the storage 112 and generates transmission signal data.

The control circuit 102 is, for example, a computer including a central processing unit (CPU), a random-access memory (RAM), a nonvolatile storage (e.g., read-only memory or ROM, a flash memory, or a hard disk drive), and an input-output (I/O) device. In this case, the CPU loads the program stored in the storage into the RAM and executes the program to implement the transmission signal generator 110 and the signal processor 111. Any computer may be used. For example, the computer may be a personal computer, an embedded computer, a smartphone, or a tablet. In some embodiments, all or part of the functions provided by the control circuit 102 may be implemented by a circuit such as an application-specific integrated circuit (ASIC) or a field-programmable gate array (FPGA). In some embodiments, distributed computing and cloud computing may allow the control circuit 102 to work together with other computers to perform the processing described later.

The pipe 120 may be formed from any material, and have any size and any shape. For example, the pipe 120 may be a metal pipe or a resin pipe. The pipe 120 may be sized in accordance with the standard defined by Japanese Industrial Standards (JIS) or the American National Standards Institute (ANSI), or sized individually. The method in the present embodiment allows highly accurate measurement of low flow rates, and thus is particularly effective in measuring small pipes, such as ⅛-inch pipes (OD: 3.18 mm, ID: 1.59 mm), ¼-inch pipes (OD: 6.35 mm, ID: 3.97 mm), and ½-inch pipes (OD: 12.70 mm, ID: 9.53 mm). The pipe may be bent or curved, rather than straight, and may have any cross section.

(Measurement)

Figure 3:
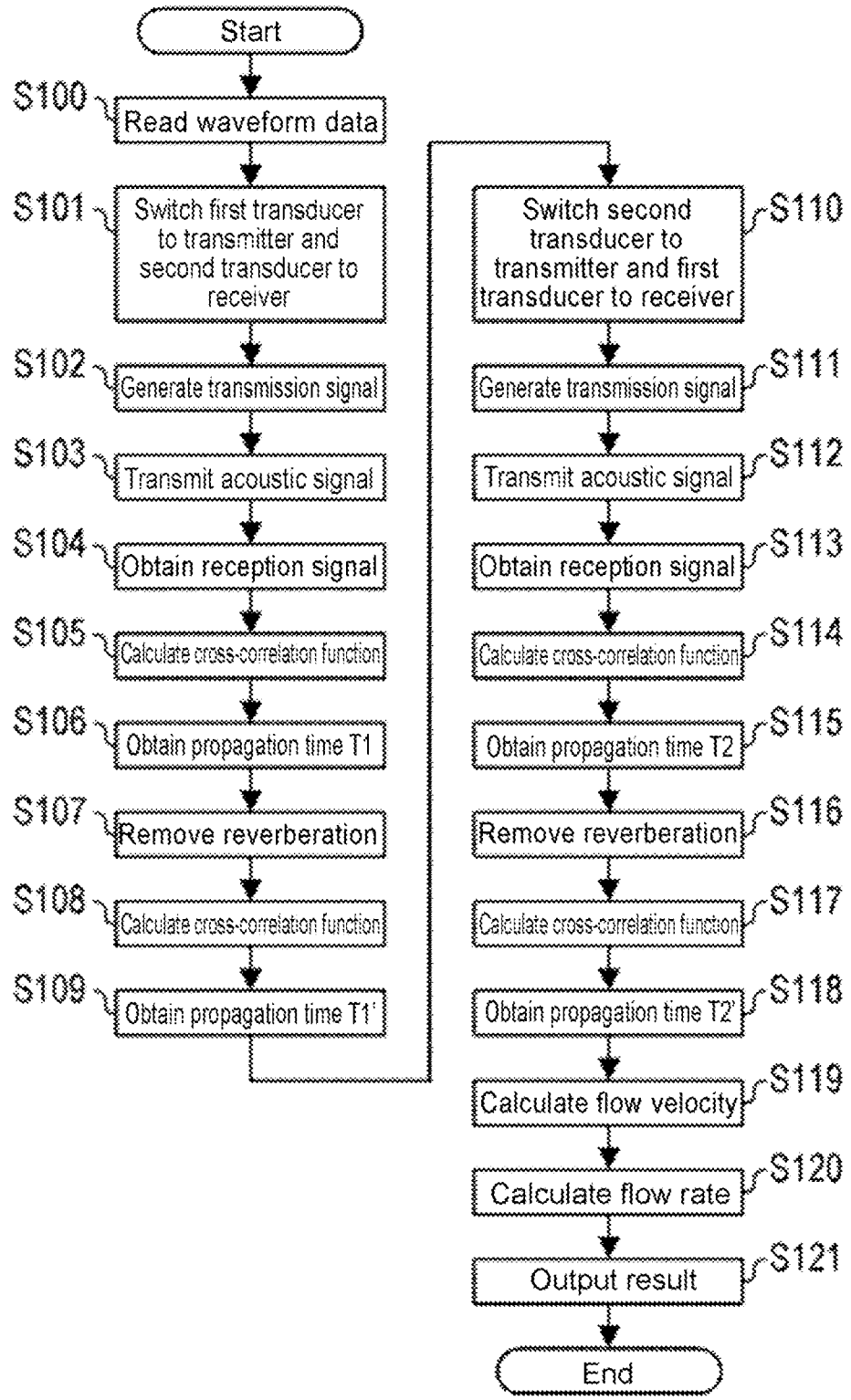
FIG. 3 is a flowchart of measurement performed by a propagation time measurement device according to a first embodiment.

The measurement performed by the propagation time measurement device 1 will be described with reference to the flowchart in FIG. 3.

In step S100, the transmission signal generator 110 in the control circuit 102 reads the waveform data about a transmission signal from the storage 112.

In step S101, the control circuit 102 controls the switch 105 to connect the D/A converter 103 to the first transducer 101a and the A/D converter 104 to the second transducer 101b. The first transducer 101a thus serves as a transmitter, and the second transducer 101b as a receiver.

In step S102, the transmission signal generator 110 generates a transmission signal based on the waveform data read in step S100 and outputs the signal to the D/A converter 103. The transmission signal is temporarily stored in a RAM (work memory) for cross-correlation analysis performed later.

Figure 4A:
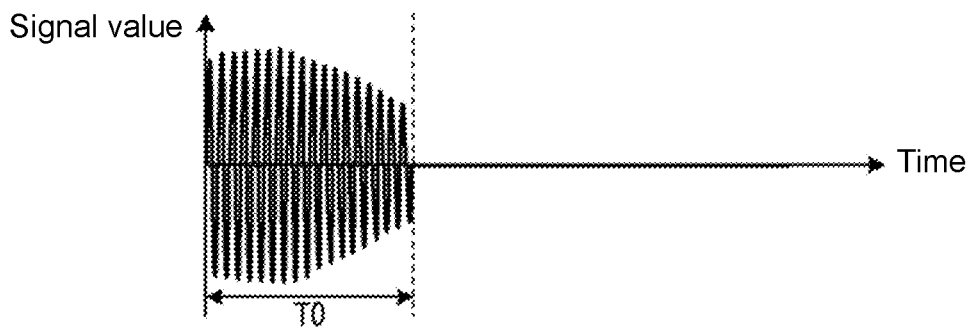
FIG. 4A is a diagram of an example transmission signal.
Figure 4B:
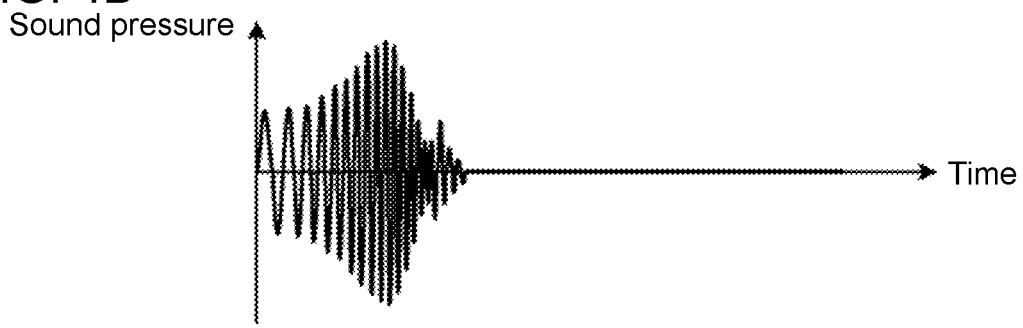
FIG. 4B is a diagram of an example acoustic signal based on the transmission signal in FIG. 4A.

In step S103, the transmission signal resulting from D/A conversion and amplification performed by the D/A converter 103 is input into the first transducer 101a, which then transmits an acoustic signal based on the transmission signal. FIG. 4A is a diagram of an example transmission signal, with the horizontal axis representing time and the vertical axis representing the signal value. FIG. 4B is a diagram of an example acoustic signal based on the transmission signal in FIG. 4A, with the horizontal axis representing time and the vertical axis representing the sound pressure. In this example, the amplitude of the acoustic signal is not constant despite the constant amplitude of the transmission signal due to the frequency response of the transducer. The acoustic signal travels through the clamp 30, the pipe 120, and the fluid 121 to the second transducer 101b.

Figure 4C:
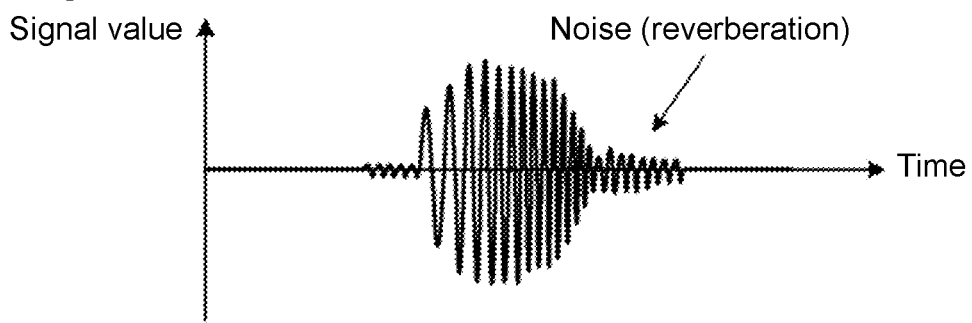
FIG. 4C is a diagram of an example reception signal.

In step S104, the second transducer 101b converts the received acoustic signal to a reception signal and outputs the reception signal to the A/D converter 104. FIG. 4C is a diagram of an example reception signal, with the horizontal axis representing time and the vertical axis representing the signal value. In FIG. 4C, the vertical axis is enlarged relative to the vertical axis in FIG. 4A. The acoustic signal is attenuated through propagation. Thus, the reception signal has an amplitude (a voltage) on the order of about 1/100 to 1/1000 of the transmission signal. For example, the transmission signal in FIG. 4A has an amplitude of about 30 V, whereas the reception signal in FIG. 4C has an amplitude of about 10 mV. Additionally, various noise components including reverberation are contained in the reception signal, as shown in FIG. 4C. The reception signal resulting from A/D conversion performed by the A/D converter 104 enters the control circuit 102 and is temporarily stored into the RAM (work memory).

Figure 4D:
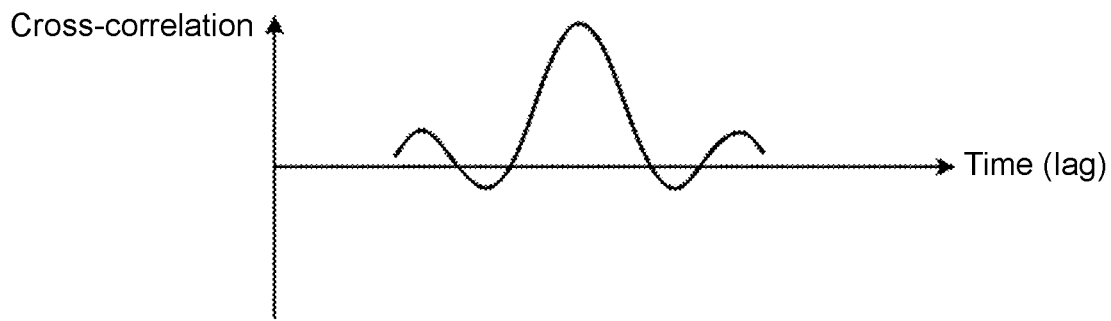
FIG. 4D is a diagram of an example cross-correlation function.

In step S105, the signal processor 111 reads the transmission signal and the reception signal from the RAM and calculates the cross-correlation function between the two signals. FIG. 4D is a diagram of an example cross-correlation function, showing an area near the maximum peak alone in an enlarged manner. The horizontal axis represents time (time shift), and the vertical axis represents the value of cross-correlation normalized to have the maximum peak height of 1. The cross-correlation function is a known technique, and is not described in detail herein.

In step S106, the signal processor 111 determines the temporal position of the maximum peak (vertex) in the cross-correlation function calculated in step S105 as a propagation time T1 of the acoustic signal from the first transducer 101a to the second transducer 101b. The propagation time T1 is affected by, for example, reverberation of the reception signal and deviates from the actual propagation time.

Figure 5A:
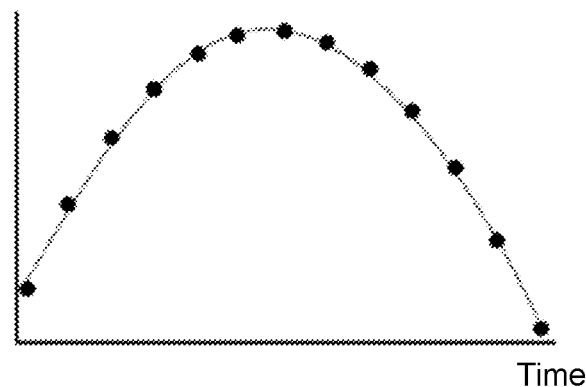
FIG. 5A is a diagram of an example cross-correlation function.
Figure 5B:
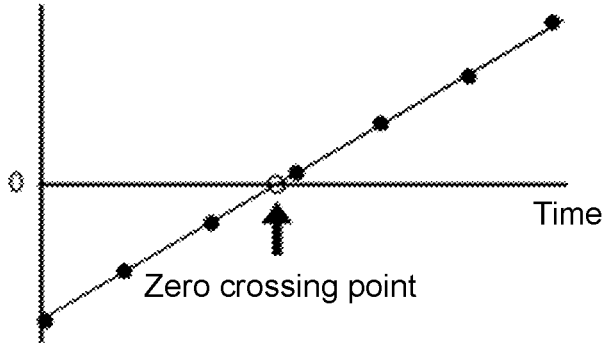
FIG. 5B is a diagram of an example of Hilbert transform.

Due to the limitation on digital signal processing, the cross-correlation function calculated in step S105 is represented as discrete data. Thus, as in FIG. 5A, the points at which the cross-correlation function data is obtained (the points indicated by solid circles) may not match the peak (vertex) position. In step S106, the signal processor 111 may thus approximate the shape of the waveform of the maximum peak and around the maximum peak (the waveform of the maximum peak) from the discrete data of the cross-correlation function and then estimate the position of the maximum peak. For example, as shown in FIG. 5B, the signal processor 111 may transform the data near the maximum peak in the cross-correlation function to phase data by Hilbert transform. The resultant data may then be linearly approximated to use the zero crossing point (the position at which the phase is zero) on the approximate line as the position of the maximum peak. In some embodiments, the signal processor 111 may estimate the shape of the waveform of the maximum peak by interpolating the data near the maximum peak in the cross-correlation function by polynomial approximation to determine the vertex position. Such processing allows determination of the position at which the cross-correlation is maximum, or more specifically, the propagation time of the acoustic signal, with a resolution higher than the sampling intervals of A/D conversion.

Figure 6:
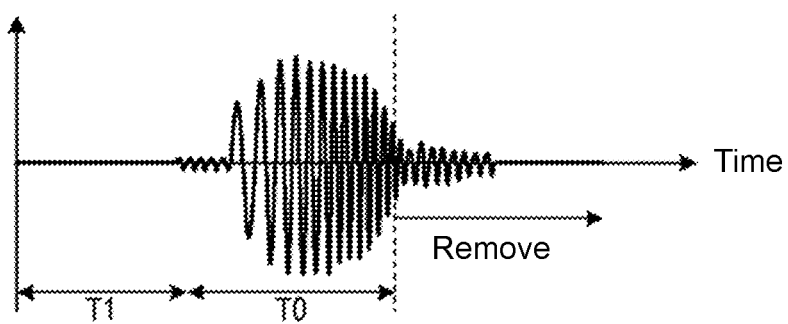
FIG. 6 is a diagram describing removal of reverberation in the first embodiment.

In step S107, the signal processor 111 removes, as reverberation, any signal component at and after the time point based on the propagation time T1 determined in step S106 from the reception signal read in step S105. The receiving transducer is expected to receive an acoustic signal with the same duration as the transmission signal after the propagation time elapses. Any signal component contained in the reception signal after the acoustic signal is received is expected to be reverberation. Thus, as shown in FIG. 6, the signal processor 111 removes, from the reception signal, as reverberation, any signal component at and after the time point at which the total time of the propagation time T1 and a duration TO of the transmission signal elapses from when the transmission signal is input into the first transducer 101a. The reverberation can thus be removed accurately.

In step S108, the signal processor 111 calculates the cross-correlation function between the transmission signal read in step S105 and the reception signal from which the reverberation has been removed in step S107.

In step S109, the signal processor 111 determines the temporal position of the maximum peak (vertex) in the cross-correlation function calculated in step S108 as a propagation time T1' of the acoustic signal from the first transducer 101a to the second transducer 101b. With the reverberation being removed from the reception signal, the propagation time T1' determined in this step is close to the actual propagation time.

In step S110, the control circuit 102 controls the switch 105 to connect the D/A converter 103 to the second transducer 101b and the A/D converter 104 to the first transducer 101a. In other words, the transmitting transducer is switched to the receiving transducer and the receiving transducer is to the transmitting transducer. The processing in subsequent steps S111 to S118 is the same as the processing in steps S102 to S109 (except that the first transducer 101a is replaced with the second transducer 101b and the second transducer 101b with the first transducer 101a). In step S115, a propagation time T2 of the acoustic signal from the second transducer 101b to the first transducer 101a is determined from the cross-correlation function based on the reception signal from which the reverberation has yet to be removed. In step S118, a propagation time T2' of the acoustic signal from the second transducer 101b to the first transducer 101a is determined from the cross-correlation function based on the reception signal from which the reverberation has been removed.

The processing described above determines the propagation time T1' of the acoustic signal from the first transducer 101a to the second transducer 101b and the propagation time T2' of the acoustic signal from the second transducer 101b to the first transducer 101a. When the fluid 121 flows in the pipe 120, a time difference occurs between the propagation time T1' and the propagation time T2' in accordance with the flow velocity of the fluid 121. Thus, the propagation time T1' and the propagation time T2' can be used to calculate the flow velocity and the flow rate of the fluid 121. The propagation time T1' and the propagation time T2' are accurately determined after the reverberation is removed, thus allowing the flow velocity and flow rate of the fluid 121 to be determined accurately as well.

In step S119, the signal processor 111 determines a flow velocity V of the fluid 121 with the formula below.

$$V = \frac{L}{2\cos\theta}\left(\frac{1}{Tba - To} - \frac{1}{Tab - To}\right) \quad \text{[Math. 1]}$$

In the formula, V is the flow velocity of the fluid, L is the length of the propagation path in the pipe, θ is the propagation angle, Tab is the propagation time T1' from the upstream transducer to the downstream transducer, Tba is the propagation time T2' from the downstream transducer to the upstream transducer, and To is the propagation time for a non-fluid portion. The propagation time To for the non-fluid portion is, for example, the time for the acoustic signal to propagate through the clamp 30 and the pipe 120, and can be predetermined through experiment or simulation based on the specifications of the pipe 120 (e.g., the inner diameter, outer diameter, or material).

In step S120, the signal processor 111 determines a flow rate Q of the fluid with the formula below.

$$Q = V \times A \quad \text{[Math. 2]}$$

In the formula, Q is the flow rate of the fluid, V is the flow velocity of the fluid, and A is the hollow cross-section of the pipe. The hollow cross-section A is known in this example.

In step S121, the signal processor 111 outputs the processing results (e.g., the propagation time, the flow velocity, and the flow rate) to the output device 106.

Advantages of Present Embodiment

The structure in the present embodiment described above allows the time point at which reverberation occurs to be determined accurately based on the propagation time determined using the reception signal from which the reverberation has yet to be removed. The structure then removes, as the reverberation, any signal component at and after the time point determined as above from the reception signal, and uses the resultant reception signal to redetermine the propagation time. The reverberation can thus be removed accurately, and the propagation time can be determined accurately. Thus, the structure can be used in highly-accurate measurement situations such as measuring a low flow rate. Additionally, calculating the propagation time can avoid use of unintended signal values (signal values representing the reverberation). This reduces the processing time for calculating the propagation time and the power consumption used to calculate the propagation time.

Second Embodiment

A propagation time measurement device 1 according to a second embodiment of the present invention removes reverberation with the second method described above. The basic structure is the same as in the first embodiment. Thus, the second embodiment will be described focusing on the difference from the first embodiment.

Figure 7:
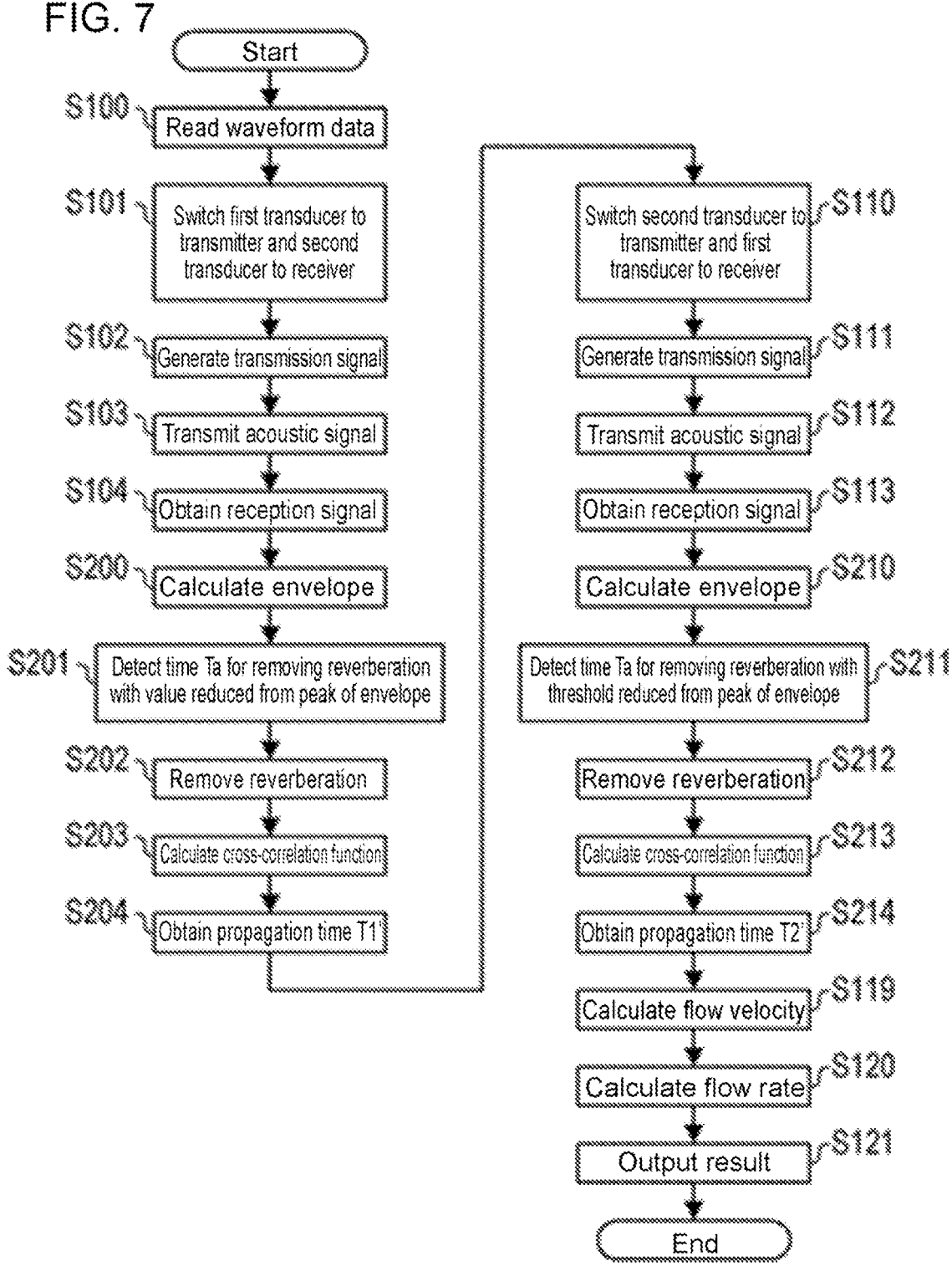
FIG. 7 is a flowchart of measurement performed by a propagation time measurement device according to a second embodiment.

FIG. 7 is a flowchart of measurement performed by the propagation time measurement device 1 according to the second embodiment. The same step numbers denote the same processing steps in the flowchart in the first embodiment (FIG. 3).

Figure 8:
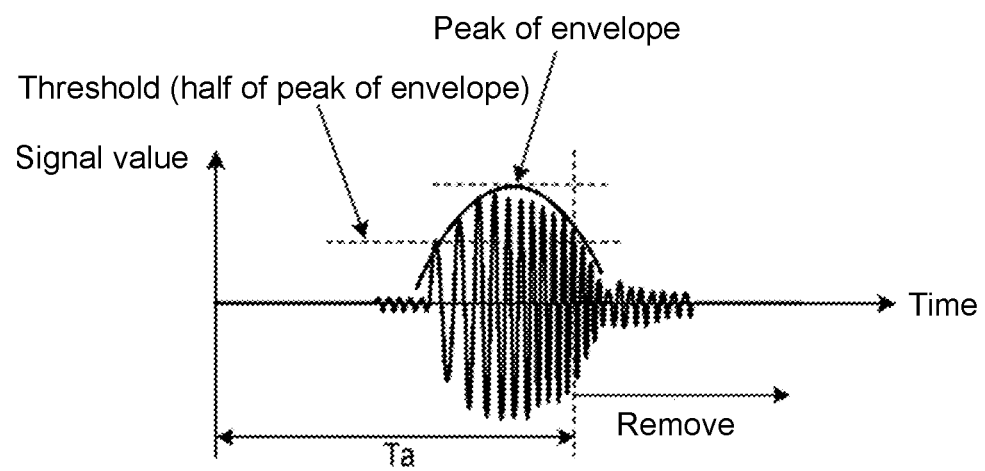
FIG. 8 is diagram describing removal of reverberation in the second embodiment.

The processing in steps S100 to S104 is the same as in the first embodiment. In step S200, the signal processor 111 reads the reception signal from the RAM and approximates the envelope of the waveform of the reception signal, as shown in FIG. 8. The envelope can be determined with a known technique and will not be described in detail.

In step S201, the signal processor 111 determines a value obtained by reducing the peak of the envelope determined in step S200 by a predetermined factor as a threshold and detects a time Ta taken for the signal value to converge to or below the determined threshold from the reception signal read in step S200. The predetermined factor is not limited, but is, for example, ½ times.

In step S202, the signal processor 111 removes, as reverberation, any signal component after the time Ta detected in step S201 from the reception signal read in step S200, as shown in FIG. 8.

In step S203, the signal processor 111 reads the transmission signal from the RAM and calculates the cross-correlation function between the read transmission signal and the reception signal from which the reverberation has been removed in step S202.

In step S204, the signal processor 111 determines the temporal position of the maximum peak (vertex) in the cross-correlation function calculated in step S203 as the propagation time T1' of the acoustic signal from the first transducer 101a to the second transducer 101b. With the reverberation being removed from the reception signal, the propagation time T1' determined in this step is close to the actual propagation time.

The processing in steps S110 to S113 is the same as in the first embodiment. The processing in steps S210 to S214 is the same as the processing in steps S200 to S204 (except that the first transducer 101a is replaced with the second transducer 101b and the second transducer 101b with the first transducer 101a). In step S211, the signal processor 111 determines, as a threshold, a value obtained by reducing the peak of the envelope determined in step S210 by a predetermined factor and detects a time Tb taken for the signal value to converge to or below the determined threshold from the reception signal read in step S210. In step S214, a propagation time T2' of the acoustic signal from the second transducer 101b to the first transducer 101a is determined from the cross-correlation function based on the reception signal from which the reverberation has been removed. The processing in steps S119 to S121 is the same as in the first embodiment.

The structure according to the present embodiment described above determines, as a threshold, the envelope of the waveform of the reception signal from which the reverberation has yet to be removed and determines the value obtained by reducing the peak of the determined envelope by the predetermined factor. The structure then removes any signal component at and after the time point at which the signal value converges to or below the determined threshold as reverberation and uses the reception signal from which the reverberation has been removed to determine the propagation time. The reverberation can thus be removed accurately, and the propagation time can be determined accurately. Thus, the structure can be used in highly-accurate measurement situations such as measuring a low flow rate. Additionally, calculating the propagation time can avoid use of unintended signal values (signal values representing the reverberation). This reduces the processing time for calculating the propagation time and the power consumption used to calculate the propagation time.

Third Embodiment

A propagation time measurement device 1 according to a third embodiment of the present invention removes reverberation with the second method described above. The specific method for removing reverberation differs from the method in the second embodiment. The basic structure is the same as in the above embodiments. Thus, the third embodiment will be described focusing on the difference from the above embodiments.

Figure 9:
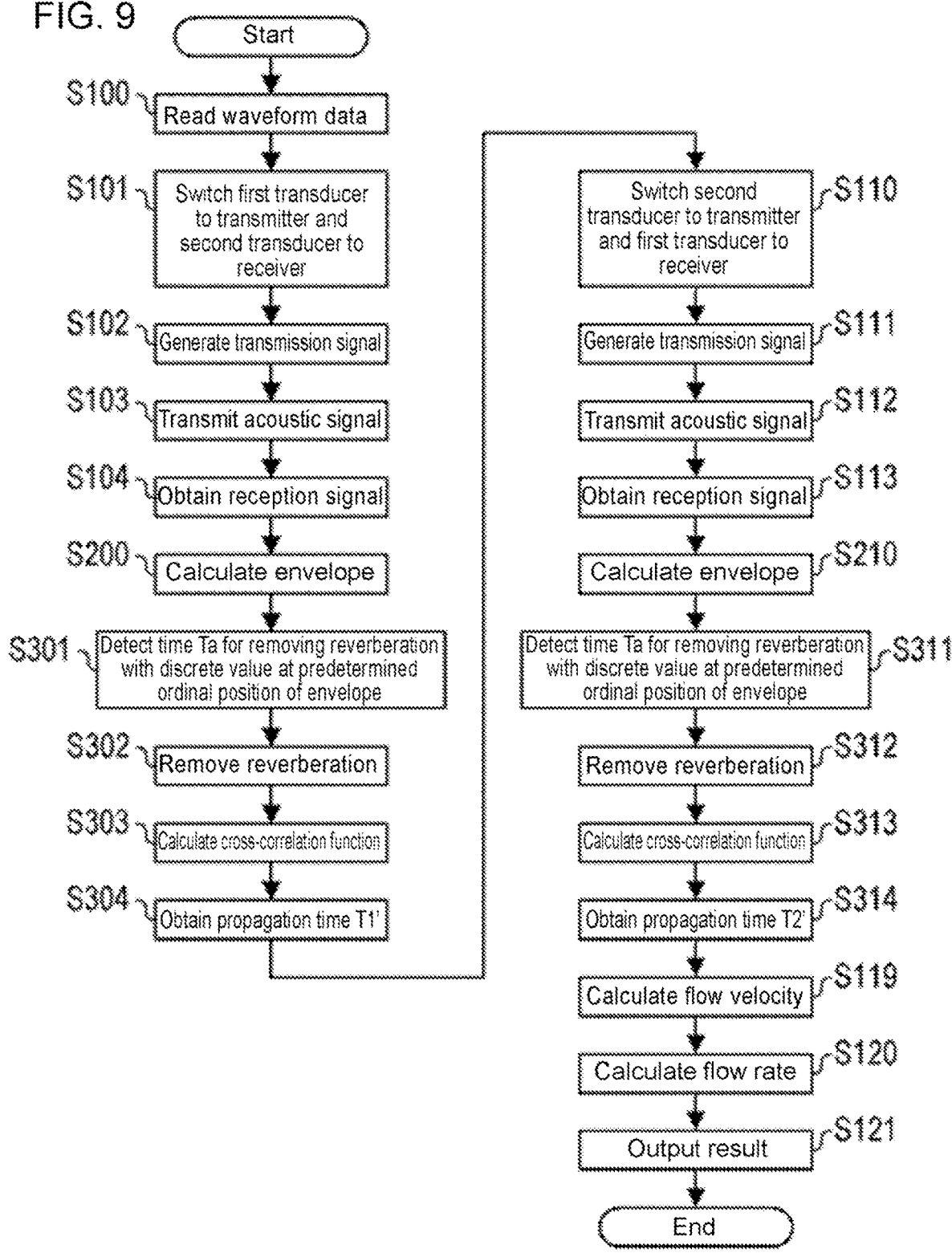
FIG. 9 is a flowchart of measurement performed by a propagation time measurement device according to a third embodiment.

FIG. 9 is a flowchart of measurement performed by the propagation time measurement device 1 according to the third embodiment. The same step numbers denote the same processing steps in the flowchart in the second embodiment (FIG. 7).

The processing in steps S100 to S104 and step S200 is the same as in the second embodiment. The envelope data determined in step S200 is discrete data. The time intervals of the multiple discrete values included in the envelope are not limited, but are equivalent to the time intervals of the multiple peaks shown by the reception signal, or more specifically, identical to the time intervals of the multiple peaks shown by the transmission signal.

In step S301, the signal processor 111 determines, as a threshold, one of the multiple discrete values at a predetermined ordinal position from the greatest value included in the envelope determined in step S200. The signal processor 111 then detects a time Ta taken for the signal value to converge to or below the determined threshold from the reception signal read in step S200. The predetermined ordinal position is not limited, but is, for example, the tenth position.

Figure 10:
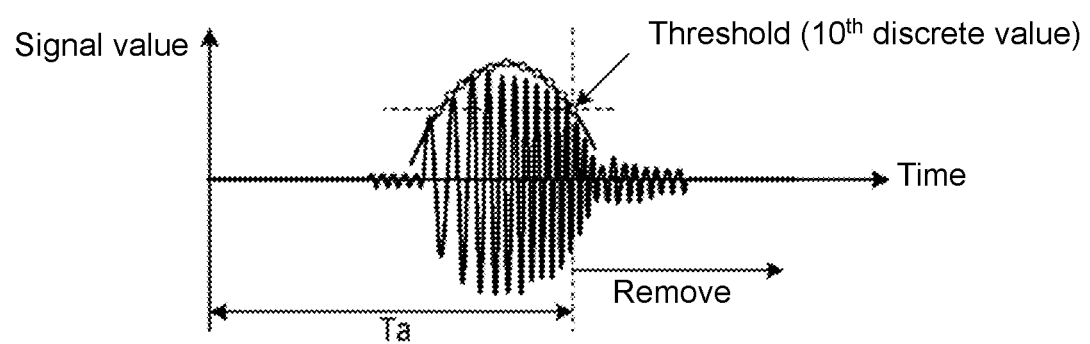
FIG. 10 is a diagram describing removal of reverberation in the third embodiment.

In step S302, the signal processor 111 removes, as reverberation, any signal component at and after the time Ta detected in step S301 from the reception signal read in step S200, as shown in FIG. 10.

In step S303, the signal processor 111 reads the transmission signal from the RAM and calculates the cross-correlation function between the read transmission signal and the reception signal from which the reverberation has been removed in step S302.

In step S304, the signal processor 111 determines the temporal position of the maximum peak (vertex) in the cross-correlation function calculated in step S303 as a propagation time T1' of the acoustic signal from the first transducer 101a to the second transducer 101b. With the reverberation being removed from the reception signal, the propagation time T1' determined in this step is close to the actual propagation time.

The processing in steps S110 to S113 and step S210 is the same as in the second embodiment. The processing in steps S311 to S314 is the same as the processing in steps S301 to S304 (except that the first transducer 101a is replaced with the second transducer 101b and the second transducer 101b with the first transducer 101a). In step S311, the signal processor 111 determines, as a threshold, one of the multiple discrete values at a predetermined ordinal position from the greatest value included in the envelope determined in step S210. The signal processor 111 then detects a time Tb taken for the signal value to converge to or below the determined threshold from the reception signal read in step S210. In step S314, a propagation time T2' of the acoustic signal from the second transducer 101b to the first transducer 101a is determined from the cross-correlation function based on the reception signal from which the reverberation has been removed. The processing in steps S119 to S121 is the same as in the second embodiment.

The structure according to the present embodiment described above determines the envelope of the waveform of the reception signal from which the reverberation has yet to be removed and determines, as a threshold, one of the multiple discrete values at the predetermined ordinal position from the greatest value included in the determined envelope. The structure then removes any signal component at and after the time point at which the signal value converges to or below the determined threshold as reverberation and uses the reception signal from which the reverberation has been removed to determine the propagation time. The reverberation can thus be removed accurately, and the propagation time can be determined accurately. Thus, the structure can be used in highly-accurate measurement situations such as measuring a low flow rate. Additionally, calculating the propagation time can avoid use of unintended signal values (signal values representing the reverberation). This reduces the processing time for calculating the propagation time and the power consumption used to calculate the propagation time.

Fourth Embodiment

A propagation time measurement device 1 according to a fourth embodiment of the present invention removes reverberation with the third method described above. The basic structure is the same as in the above embodiments. Thus, the fourth embodiment will be described focusing on the difference from the above embodiments.

Figure 11:
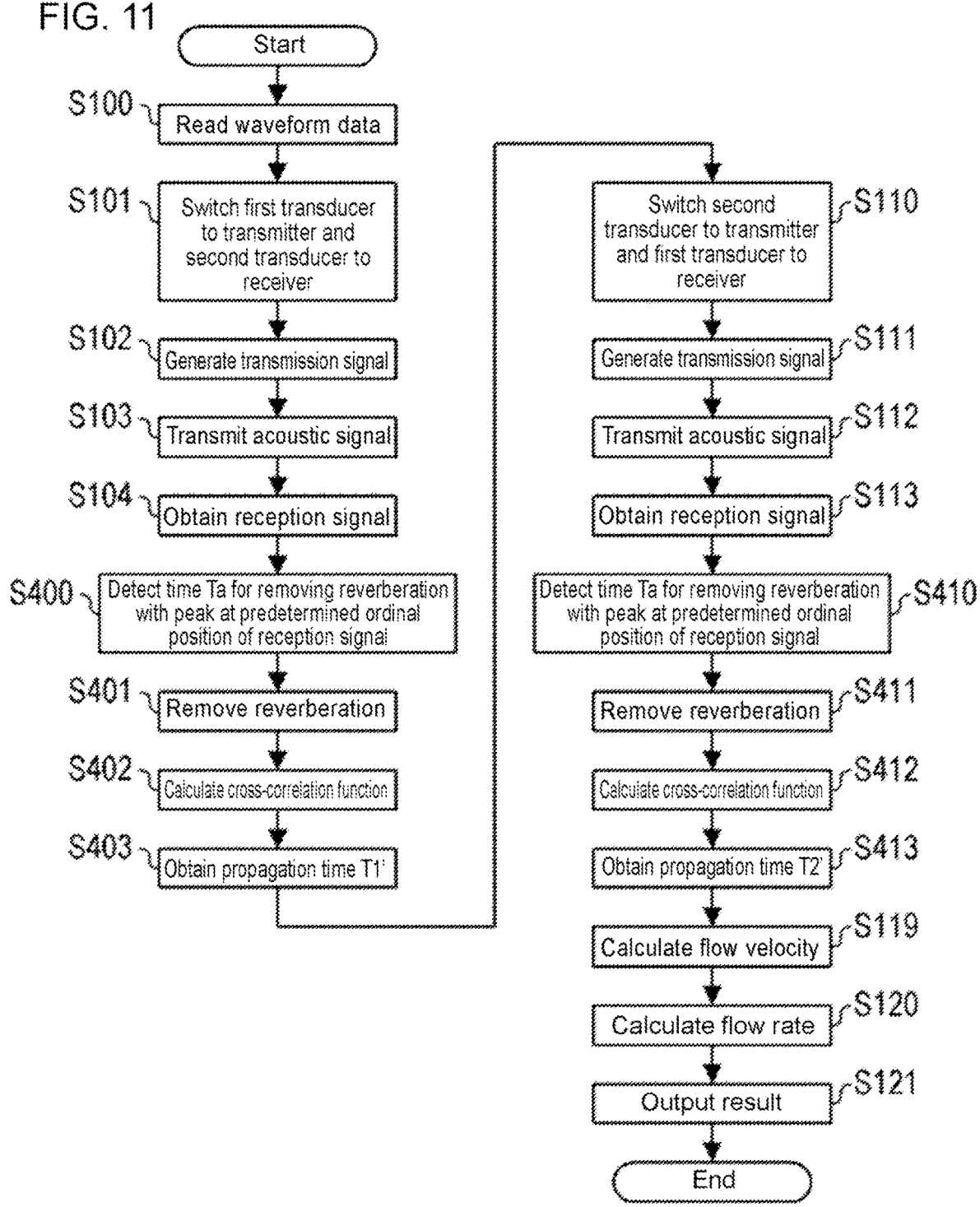
FIG. 11 is a flowchart of measurement performed by a propagation time measurement device according to a fourth embodiment.

FIG. 11 is a flowchart of measurement performed by the propagation time measurement device 1 according to the fourth embodiment. The same step numbers denote the same processing steps in the flowchart in the first embodiment (FIG. 3).

The processing in steps S100 to S104 is the same as in the first embodiment. In step S400, the signal processor 111 reads the reception signal from the RAM and determines, as a threshold, one of the multiple peaks at the predetermined ordinal position from the highest peak shown by the reception signal. The signal processor 111 then detects a time Ta taken for the signal value to converge to or below the determined threshold from the reception signal. The predetermined ordinal position is not limited, but is, for example, the tenth position.

Figure 12:
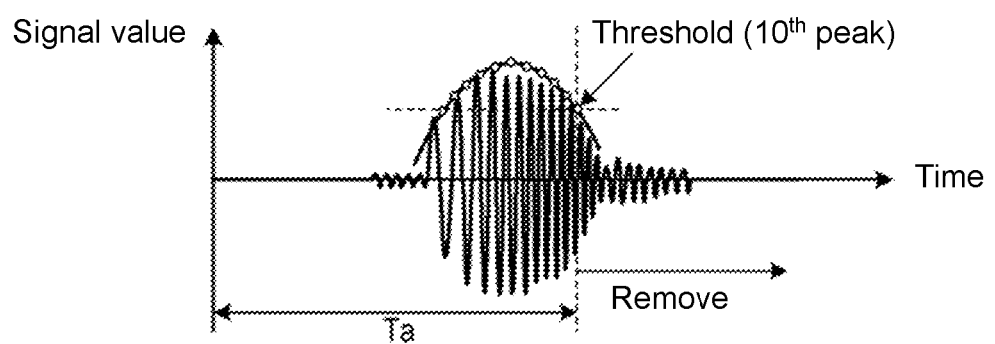
FIG. 12 is a diagram describing removal of reverberation in the fourth embodiment.

In step S401, the signal processor 111 removes, as reverberation, any signal component at and after the time Ta detected in step S400 from the reception signal read in step S400, as shown in FIG. 12.

In step S402, the signal processor 111 reads the transmission signal from the RAM and calculates the cross-correlation function between the read transmission signal and the reception signal from which the reverberation has been removed in step S401.

In step S403, the signal processor 111 determines the temporal position of the maximum peak (vertex) in the cross-correlation function calculated in step S402 as a propagation time T1' of the acoustic signal from the first transducer 101a to the second transducer 101b. With the reverberation being removed from the reception signal, the propagation time T1' determined in this step is close to the actual propagation time.

The processing in steps S110 to S113 is the same as in the first embodiment. The processing in steps S410 to S413 is the same as the processing in steps S400 to S403 (except that the first transducer 101a is replaced with the second transducer 101b and the second transducer 101b with the first transducer 101a). In step S410, the signal processor 111 reads the reception signal (the reception signal obtained in step S113) from the RAM and determines, as a threshold, one of the multiple peaks at the predetermined ordinal position from the highest peak shown by the reception signal. The signal processor 111 then detects a time Tb taken for the signal value to converge to or below the threshold from the reception signal. In step S413, a propagation time T2' of the acoustic signal from the second transducer 101b to the first transducer 101a is determined from the cross-correlation function based on the reception signal from which the reverberation has been removed. The processing in steps S119 to S121 is the same as in the first embodiment.

The structure according to the present embodiment described above determines, as a threshold, one of the multiple peaks at the predetermined ordinal position from the highest peak shown by the reception signal from which the reverberation has yet to be removed. The structure then removes any signal component at and after the time point at which the signal value converges to or below the determined threshold as reverberation and uses the reception signal from which the reverberation has been removed to determine the propagation time. The reverberation can thus be removed accurately, and the propagation time can be determined accurately. Thus, the structure can be used in highly-accurate measurement situations such as measuring a low flow rate. Additionally, calculating the propagation time can avoid use of unintended signal values (signal values representing the reverberation). This reduces the processing time for calculating the propagation time and the power consumption used to calculate the propagation time. A reception signal sampled at certain periods (resolutions) may not include any peak that is to occur in the reception signals. In such cases, although the structures in the first to third embodiments may be expected to determine the propagation time more accurately, the structures involve more processes such as determining a tentative propagation time or determining the envelope.

<Others>

The embodiments described above are mere examples of the present invention. The present invention is not limited to the specific embodiments described above, but may be modified variously within the scope of the technical ideas of the invention. For example, in the device according to each of the above embodiments, after measurement of the propagation time of the acoustic signal, the measured propagation time is used to calculate the flow velocity and the flow rate of the fluid. In some embodiments, the flow velocity and the flow rate are not calculated. The propagation time measurement device may simply measure the propagation time (at least one of the propagation time T1' or the propagation time T2'). The propagation angle θ may be 90 degrees for simply measuring the propagation time. In the above embodiments, the clamp-on device to clamp the pipe is used. In some embodiments, the device may be incorporated in the pipe. The transducers may be three or more transducers, including transducer pairs for propagating acoustic signals downstream and transducer pairs for propagating acoustic signals upstream. The transmitting transducer and the receiving transducer may be at any different positions with respect to the pipe, rather than being opposite to each other across the pipe or at different positions in the longitudinal direction of the pipe.

The storage 112 may prestore information about the time point at which reverberation occurs, and the signal processor 111 may remove the reverberation based on the information stored in the storage 112. The information about the time point at which reverberation occurs may or may not simply indicate the time point (e.g., the time T1+the time T0 or the time T2+the time T0 in the first embodiment or the time Ta or the time Tb in the second to fourth embodiments). For example, the information about the time point at which reverberation occurs may indicate the propagation time (the propagation time T1 or the propagation time T2 in the first embodiment) determined using the reception signal containing reverberation. The information about the time point at which reverberation occurs may indicate a threshold (the thresholds used in the second to fourth embodiments) based on the envelope or multiple peaks. The information about the time point at which reverberation occurs is obtained in the same manner as described in the first to fourth embodiments in, for example, premeasurement. In measurement, instead of determining the information about the time point at which reverberation occurs, the signal processor 111 reads the same information from the storage 112. For example, to obtain the propagation time T1' with the method in the first embodiment, the processing in steps S101 to S106 in FIG. 3 is performed in the premeasurement. The signal processor 111 then stores the determined propagation time T1 into the storage 112. In measurement, the processing in steps S101 to S104 is performed, and the signal processor 111 reads the propagation time T1 from the storage 112 and performs the processing in steps S107 to S109.

The pair of transducers may transmit and receive the acoustic signal multiple times in measurement of the propagation time T1' or the propagation time T2'. The signal processor 111 may then use the multiple reception signals resulting from the multiple transmission and reception operations to obtain information about the time point at which reverberation occurs. The combination of multiple reception signals can apparently increase the resolution, and thus the use of multiple reception signals allows the time point at which the reverberation occurs to be determined more accurately. For example, the propagation time T1, the propagation time T2, the envelope, and the peaks of the reception signal can be determined more accurately. This thus allows the reverberation to be removed more accurately and the propagation time to be determined more accurately.

In the second to fourth embodiments, the time Ta for removing the reverberation from the reception signal obtained by the second transducer 101b (corresponding to the acoustic signal from the first transducer 101a to the second transducer 101b) and the time Tb for removing the reverberation from the reception signal obtained by the first transducer 101a (corresponding to the acoustic signal from the second transducer 101b to the first transducer 101a) are determined separately. However, the manner of determining the times Ta and Tb is not limited to this example. For example, one of the time Ta or the time Tb may be detected, and the detected time may also be used as the other of the time Ta or the time Tb. This reduces the processing load and the processing time. For example, the time Ta alone is detected, and the time Ta is used as the time Tb. This eliminates the processing in steps S210 and S211 in FIG. 7 (detection of the envelope, determination of the threshold, and detection of the time Tb), the processing in steps S210 and S311 in FIG. 9 (detection of the envelope, determination of the threshold, and detection of the time Tb), and the processing in step S410 in FIG. 11 (determination of the threshold and detection of the time Tb).

Similarly, in the first embodiment, one of the propagation time T1 or the propagation time T2 may also be used as the other of the propagation time T1 or the propagation time T2. In the second to fourth embodiments, one of the two thresholds for determining the two times Ta and Tb may also be used as the other of the two thresholds. This can also reduce the processing load and the processing time.

APPENDIX 1

A propagation time measurement device (1), comprising:
a plurality of transducers (101a, 101b) at different positions with respect to a pipe (120) through which a fluid (121) flows, the plurality of transducers (101a, 101b) including a first transducer (101a) configured to convert a transmission signal as an electrical signal to an acoustic signal and a second transducer (101b) configured to receive the acoustic signal transmitted from the first transducer (101a) through the fluid (121) in the pipe (120) and convert the received acoustic signal to a reception signal as an electrical signal; and
a signal processor (111) configured to remove reverberation from the reception signal and determine a propagation time of the acoustic signal from the first transducer to the second transducer by cross-correlation analysis between the transmission signal and the reception signal from which the reverberation has been removed,
wherein the signal processor (111)
    determines a propagation time of the acoustic signal from the first transducer (101a) to the second transducer (101b) by cross-correlation analysis between the transmission signal and the reception signal from which the reverberation has yet to be removed,
    removes, as the reverberation, a signal component at and after a time point based on the determined propagation time, and
    redetermines the propagation time of the acoustic signal from the first transducer (101a) to the second transducer (101b) by cross-correlation analysis between the transmission signal and the reception signal from which the reverberation has been removed.

APPENDIX 2

A propagation time measurement device (1), comprising:
a plurality of transducers (101a, 101b) at different positions with respect to a pipe (120) through which a fluid (121) flows, the plurality of transducers (101a, 101b) including a first transducer (101a) configured to convert a transmission signal as an electrical signal to an acoustic signal and a second transducer (101b) configured to receive the acoustic signal transmitted from the first transducer (101a) through the fluid (121) in the pipe (120) and convert the received acoustic signal to a reception signal as an electrical signal; and
a signal processor (111) configured to remove reverberation from the reception signal and determine a propagation time of the acoustic signal from the first transducer to the second transducer by cross-correlation analysis between the transmission signal and the reception signal from which the reverberation has been removed,
wherein the signal processor (111) approximates an envelope of a waveform of the reception signal from which the reverberation has yet to be removed, determines a threshold based on the envelope, and removes, as the reverberation, a signal component at and after a time point at which a signal value of the reception signal converges to or below the determined threshold.

APPENDIX 3

A propagation time measurement device (1), comprising:
a plurality of transducers (101a, 101b) at different positions with respect to a pipe (120) through which a fluid (121) flows, the plurality of transducers (101a, 101b)

including a first transducer (101a) configured to convert a transmission signal as an electrical signal to an acoustic signal and a second transducer (101b) configured to receive the acoustic signal transmitted from the first transducer (101a) through the fluid (121) in the pipe (120) and convert the received acoustic signal to a reception signal as an electrical signal; and a signal processor (111) configured to remove reverberation from the reception signal and determine a propagation time of the acoustic signal from the first transducer to the second transducer by cross-correlation analysis between the transmission signal and the reception signal from which the reverberation has been removed, wherein the signal processor (111) removes, as the reverberation, a signal component at and after a time point at which a signal value of the reception signal converges to or below a peak at a predetermined ordinal position from a highest peak of a plurality of peaks shown by the reception signal from which the reverberation has yet to be removed.

REFERENCE SIGNS LIST

1: propagation time measurement device
30: clamp
100: main body
101: transducer
101a: first transducer
101b: second transducer
102: control circuit
103: D/A converter
104: A/D converter
105: switch
106: output device
110: transmission signal generator
111: signal processor
112: storage
120: pipe
121: fluid

The invention claimed is:

1. A propagation time measurement device, comprising:
a plurality of transducers at different positions with respect to a pipe through which a fluid flows, the plurality of transducers including a first transducer configured to convert a transmission signal as an electrical signal to an acoustic signal and a second transducer configured to receive the acoustic signal transmitted from the first transducer through the fluid in the pipe and convert the received acoustic signal to a reception signal as an electrical signal; and
a signal processor configured to remove reverberation from the reception signal and determine a propagation time of the acoustic signal from the first transducer to the second transducer by cross-correlation analysis between the transmission signal and the reception signal from which the reverberation has been removed,
wherein the signal processor
determines a propagation time of the acoustic signal from the first transducer to the second transducer by cross-correlation analysis between the transmission signal and the reception signal from which the reverberation has yet to be removed,
removes, as the reverberation, a signal component at and after a time point based on the determined propagation time, and
redetermines the propagation time of the acoustic signal from the first transducer to the second transducer by cross-correlation analysis between the transmission signal and the reception signal from which the reverberation has been removed.

2. The propagation time measurement device according to claim 1, wherein
the time point is a time point at which a total time of the propagation time determined by the cross-correlation analysis between the transmission signal and the reception signal from which the reverberation has yet to be removed and a duration of the transmission signal elapses from when the transmission signal is input into the first transducer.

3. The propagation time measurement device according to claim 1, further comprising:
a storage configured to prestore information about the time point,
wherein the signal processor removes the reverberation based on the information prestored in the storage.

4. The propagation time measurement device according to claim 1, wherein
the signal processor obtains information about the time point using a plurality of reception signals resulting from a plurality of transmission operations from the first transducer and resulting from a plurality of reception operations at the second transducer.

5. The propagation time measurement device according to claim 1, wherein
the first transducer and the second transducer are opposite to each other across the pipe.

6. The propagation time measurement device according to claim 1, wherein
the first transducer and the second transducer are at different positions in a longitudinal direction of the pipe.

7. The propagation time measurement device according to claim 1, further comprising:
a switch configured to perform switching to cause the second transducer to receive an input of the transmission signal and transmit an acoustic signal and to cause the first transducer to receive the acoustic signal transmitted from the second transducer and output the reception signal,
wherein the signal processor further removes reverberation from the reception signal output from the first transducer, and determines a propagation time of the acoustic signal from the second transducer to the first transducer by cross-correlation analysis between the transmission signal input into the second transducer and the reception signal output from the first transducer and from which the reverberation has been removed.

8. The propagation time measurement device according to claim 7, wherein
the signal processor determines at least one of a flow velocity or a flow rate of the fluid in the pipe based on a difference between the propagation time of the acoustic signal from the first transducer to the second transducer and the propagation time of the acoustic signal from the second transducer to the first transducer.

9. A propagation time measurement device, comprising:
a plurality of transducers at different positions with respect to a pipe through which a fluid flows, the plurality of transducers including a first transducer configured to convert a transmission signal as an electrical signal to an acoustic signal and a second transducer configured to receive the acoustic signal transmitted from the first transducer through the fluid in the pipe and convert the received acoustic signal to a reception signal as an electrical signal; and a signal processor configured to remove reverberation from the reception signal and determine a propagation time of the acoustic signal from the first transducer to the second transducer by cross-correlation analysis between the transmission signal and the reception signal from which the reverberation has been removed, wherein the signal processor approximates an envelope of a waveform of the reception signal from which the reverberation has yet to be removed, determines a threshold based on the envelope, and removes, as the reverberation, a signal component at and after a time point at which a signal value of the reception signal converges to or below the determined threshold.

10. The propagation time measurement device according to claim 9, wherein
the signal processor determines a value obtained by reducing a peak of the envelope by a predetermined factor as the threshold.

11. The propagation time measurement device according to claim 9, wherein
the signal processor determines, as the threshold, one of a plurality of discrete values at a predetermined ordinal position from a greatest discrete value included in the envelope.

12. A propagation time measurement device, comprising:

a plurality of transducers at different positions with respect to a pipe through which a fluid flows, the plurality of transducers including a first transducer configured to convert a transmission signal as an electrical signal to an acoustic signal and a second transducer configured to receive the acoustic signal transmitted from the first transducer through the fluid in the pipe and convert the received acoustic signal to a reception signal as an electrical signal; and a signal processor configured to remove reverberation from the reception signal and determine a propagation time of the acoustic signal from the first transducer to the second transducer by cross-correlation analysis between the transmission signal and the reception signal from which the reverberation has been removed, wherein the signal processor removes, as the reverberation, a signal component at and after a time point at which a signal value of the reception signal converges to or below a peak at a predetermined ordinal position from a highest peak of a plurality of peaks shown by the reception signal from which the reverberation has yet to be removed.

* * * * *